United States Patent
Shiraishi et al.

(12) 
(10) Patent No.: US 6,202,288 B1
(45) Date of Patent: Mar. 20, 2001

(54) METHOD FOR MANUFACTURING MAGNETIC HEAD SUSPENSION ASSEMBLY WITH HEAD IC CHIP

(75) Inventors: Masashi Shiraishi; Masanori Sakai; Tsuyoshi Umehara; Haruyuki Morita; Ken-ichi Takano, all of Nagano (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/385,055

(22) Filed: Aug. 30, 1999

Related U.S. Application Data

(63) Continuation-in-part of application No. 09/216,851, filed on Dec. 21, 1998.

(30) Foreign Application Priority Data

Dec. 26, 1997 (JP) .................................................. 9-366608

(51) Int. Cl.[7] ....................................................... G11B 5/42
(52) U.S. Cl. .................................. 29/603.03; 29/603.06; 29/840; 360/103; 360/104
(58) Field of Search .......................... 29/603.03, 603.04, 29/603.05, 603.06, 827, 840, 832; 360/103, 104

(56) References Cited

U.S. PATENT DOCUMENTS

| | | |
|---|---|---|
| 3,563,443 | 2/1971 | Pedrotti et al. . |
| 4,799,119 | 1/1989 | Rossi et al. . |
| 5,687,479 | 11/1997 | Bennin et al. . |
| 5,859,749 | 1/1999 | Zarouri et al. . |
| 5,870,258 | 2/1999 | Khan et al. . |

FOREIGN PATENT DOCUMENTS

| | | |
|---|---|---|
| 53-69623 | 6/1978 | (JP) . |
| 54-94312 | 7/1979 | (JP) . |
| 55-150130 | 11/1980 | (JP) . |
| 3-108120 | 5/1991 | (JP) . |
| 3-134875 | 5/1991 | (JP) . |

*Primary Examiner*—Carl E. Hall
(74) *Attorney, Agent, or Firm*—Arent Fox Kintner Plotkin & Kahn, PLLC

(57) ABSTRACT

A method for manufacturing a magnetic head suspension assembly includes a step of forming a plurality of flexure pieces coupled with each other and kept substantially flat, each of the flexure pieces being provided with conductive connection pattern, a step of mounting head IC chips on the respective substantially flat flexure pieces, the mounting being executed before fixing of said flexure pieces to load beams, and a step of separating said flexure pieces with the head IC chips into individual pieces.

28 Claims, 6 Drawing Sheets

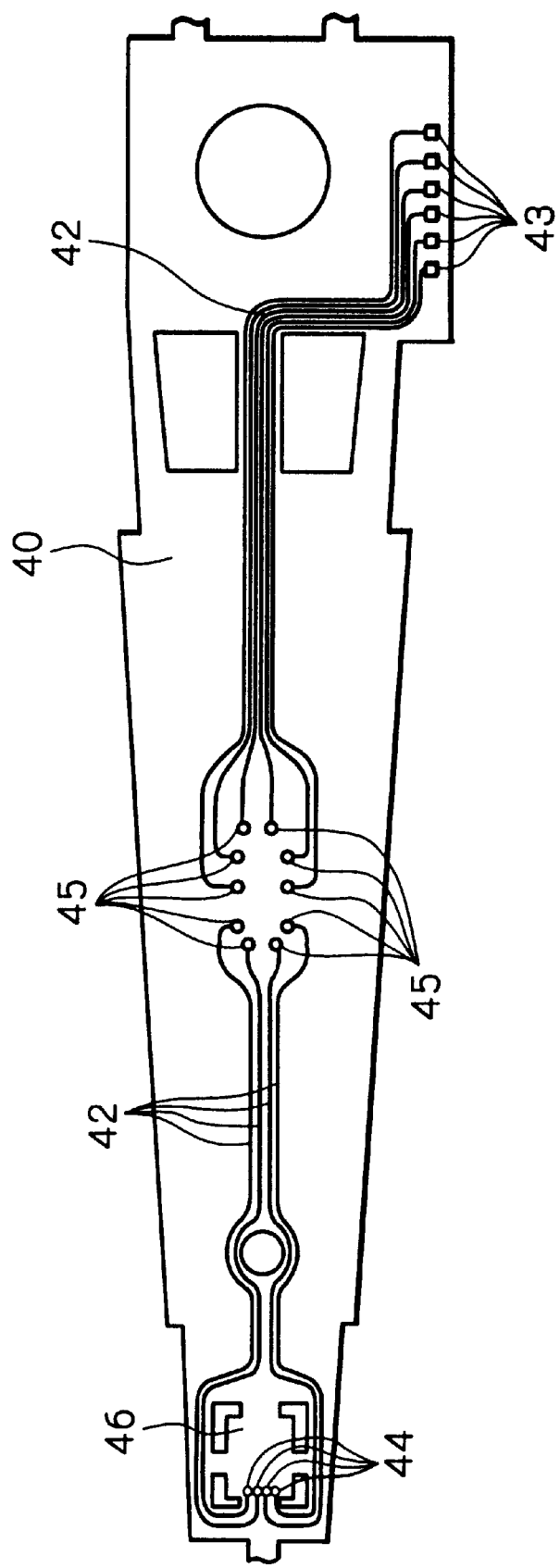

METHOD FOR MANUFACTURING MAGNETIC HEAD SUSPENSION ASSEMBLY WITH HEAD IC CHIP

CROSS-REFERENCES TO RELATED APPLICATIONS

This is a continuation-in-part application of U.S. patent application Ser. No. 09/216,851 filed on Dec. 21, 1998.

FIELD OF THE INVENTION

The present invention relates to a method for manufacturing a magnetic head suspension assembly with a head IC chip. The assembly includes a slider with at least one thin-film magnetic head element and a resilient suspension for supporting the slider.

DESCRIPTION OF THE RELATED ART

In such head suspension assembly, at least one thin-film magnetic head element for writing magnetic information into and/or reading magnetic information from a magnetic recording medium such as a magnetic disk is in general formed on a slider flying in operation above the magnetic recording medium. The slider is supported by the suspension made of a resilient thin metal plate.

A head IC chip used for amplifying writing current to the magnetic head element, for amplifying reading current from the head element and for controlling the writing and reading operations of the head element is also mounted on the suspension. Japanese patent unexamined publications nos. 53(1978)-69623, 55(1980)-150130 and 3(1991)-108120 disclose magnetic head suspension assemblies with the head IC chips mounted on the suspensions.

In fabricating these conventional magnetic head suspension assemblies, both the sliders and the head IC chips are mounted on the respective suspensions after bend portions called as "gram-loads" and side rail bend portions for reinforcement are formed at the suspensions. For example, Japanese patent unexamined publications nos. 54(1979)-94312 and 3(1991)-134875 disclose manufacturing processes of attaching sliders onto respective bent suspensions which are coupled to each other and of separating thereafter the coupled suspensions into the individual pieces.

As aforementioned, since the bent suspension according to the conventional art has a complicated three dimensional shape, fixing of the suspension itself to an assembling tool or a jig used for mounting the head IC chip becomes very difficult. Thus, precise alignment of the suspension with the head IC chip cannot be expected causing that assembling of the head IC chip with the suspension cannot be automated.

SUMMARY OF THE INVENTION

It is therefore an object of the present invention to provide a method for manufacturing a magnetic head suspension assembly, whereby extremely accurate assembling of a head IC chip with a suspension can be expected.

Another object of the present invention is to provide a method for manufacturing a magnetic head suspension assembly, whereby assembling of a head IC chip with the suspension can be easily automated.

According to the present invention, a method for manufacturing a magnetic head suspension assembly includes a step of forming a plurality of flexure pieces coupled with each other and kept substantially flat, each of the flexure pieces being provided with conductive connection pattern, a step of mounting head IC chips on the respective substantially flat flexure pieces, the mounting being executed before fixing of said flexure pieces to load beams, and a step of separating said flexure pieces with the head IC chips into individual pieces.

In case of fabricating a magnetic head suspension assembly with a three-piece structure suspension formed from discrete components of a flexure piece and a load beam, the load beam is fixed to the flexure piece after the head IC chip is mounted on the flexure piece.

Since the head IC chips are mounted on the flexure pieces which are coupled with each other and kept substantially flat, the alignment and mounting of the head IC chips to the respective flexure pieces can be accurately and easily executed, and thus extremely accurate assembling of the head-suspension assemblies can be expected. This accurate assembling will greatly improve characteristics of the magnetic head suspension assembly. Furthermore, assembling of the head IC chips with the suspensions can be easily automated. Thus, the manufacturing costs of the fabricated magnetic head suspension assembly can be reduced without sacrificing quality.

It is preferred that the method further includes a step of checking electrical characteristics of the mounted head IC chips before fixing of the flexure pieces to the load beams.

It is also preferred that the method further includes a step of mounting sliders with magnetic head elements on the separated flexure pieces.

It is preferred that the head IC chip mounting step includes a step of mounting the head IC chips on the respective flexure pieces by flip chip bonding process or by ultrasonic bonding.

It is preferred that each of the flexure pieces has a tongue portion for fixing the slider, and that the method further includes a step of bending the tongue portions of the respective flexure pieces so as to adjust static attitude of the sliders to be attached. The tongue portion bending step may be executed before the head IC chips are mounted, after the head IC chips are mounted but before the coupled flexure pieces are separated into individual pieces, or after the coupled flexure pieces are separated into individual pieces.

It is also preferred that the method further includes a step of fixing a load beam to each of the separated flexure piece. This fixing step may be executed after the head IC chips are mounted but before the coupled flexure pieces are separated into individual pieces, or after the coupled flexure pieces are separated into individual pieces.

It is preferred that the forming step includes a step of forming the plurality of flexure pieces coupled with each other from a flat sheet material, or from a rolled hoop material.

It is also preferred that the mounting step includes a step of mounting sliders with magnetoresistive type read out magnetic head elements on the respective flexure pieces.

According to the present invention, a method for manufacturing a magnetic head suspension assembly includes a step of forming a plurality of flexure-load beam pieces coupled with each other and kept substantially flat, each of the flexure-load beam pieces being provided with conductive connection pattern, a step of mounting head IC chips on the respective substantially flat flexure-load beam pieces, the mounting being executed before the flexure-load beam pieces are bent, and a step of separating the flexure-load beam pieces with the head IC chips into individual pieces.

In case of fabricating a magnetic head suspension assembly with a two-pieces structure suspension formed from a flexure-load beam piece which serves both as a flexure and a load beam, bending process of the flexure-load beam piece is executed after the head IC chip is mounted on the flexure-load beam piece.

Since the head IC chips are mounted on the flexure-load beam pieces which are coupled with each other and kept substantially flat, the alignment and mounting of the head IC chips to the respective flexure-load beam pieces can be accurately and easily executed, and thus extremely accurate assembling of the head-suspension assemblies can be expected. This accurate assembling will greatly improve characteristics of the magnetic head suspension assembly. Furthermore, assembling of the head IC chips with the suspensions can be easily automated. Thus, the manufacturing costs of the fabricated magnetic head suspension assembly can be reduced without sacrificing quality.

It is preferred that the method further includes a step of checking electrical characteristics of the mounted head IC chips before the flexure-load beam pieces are bent.

It is also preferred that the method further includes a step of mounting sliders with magnetic head elements on the separated flexure-load beam pieces.

It is preferred that the head IC chip mounting step includes a step of mounting the head IC chips on the respective flexure-load beam pieces by flip chip bonding process or by ultrasonic bonding process.

It is preferred that each of the flexure-load beam pieces has a tongue portion for fixing the slider, and that the method further includes a step of bending the tongue portions of the respective flexure-load beam pieces so as to adjust static attitude of the sliders to be attached. The tongue portion bending step may be executed before the head IC chips are mounted, after the head IC chips are mounted but before the coupled flexure-load beam pieces are separated into individual pieces, or after the coupled flexure-load beam pieces are separated into individual pieces.

It is preferred that the method further includes a step of bending each of the flexure-load beam pieces. This flexure-load beam bending step may be executed after the head IC chips are mounted but before the coupled flexure-load beam pieces are separated into individual pieces, or after the coupled flexure-load beam pieces are separated into individual pieces.

It is also preferred that the forming step includes a step of forming the plurality of flexure-load beam pieces coupled with each other from a flat sheet material or from a rolled hoop material.

It is preferred that the mounting step includes a step of mounting sliders with magnetoresistive type read out magnetic head elements on the respective flexure-load beam pieces.

Further objects and advantages of the present invention will be apparent from the following description of the preferred embodiments of the invention as illustrated in the accompanying drawings.

BRIEF DESCRIPTION OF THE DRAWINGS

FIG. 2 shows an enlarged plane view of a flexure piece under the process of FIG. 1a;

FIG. 5 shows an enlarged plane view of a flexure-load beam piece under the process of FIG. 4a.

DESCRIPTION OF THE PREFERRED EMBODIMENTS

Figure 1A:
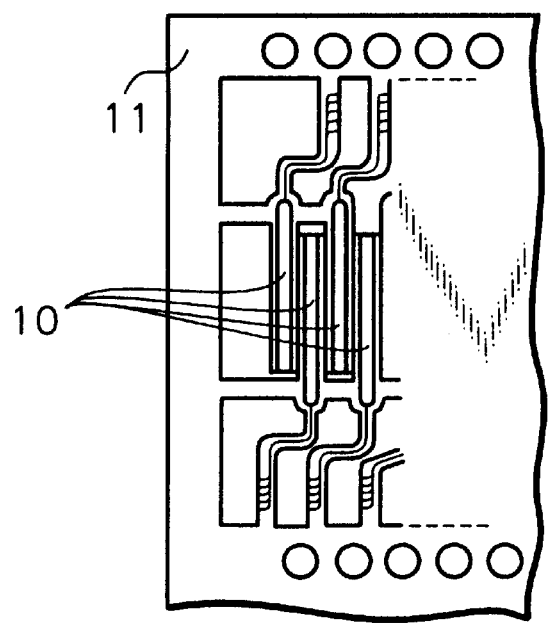
FIGS. 1a and 1b show plane views illustrating parts of processes of a preferred embodiment of a method for manufacturing a magnetic head suspension assembly according to the present invention.
Figure 1B:
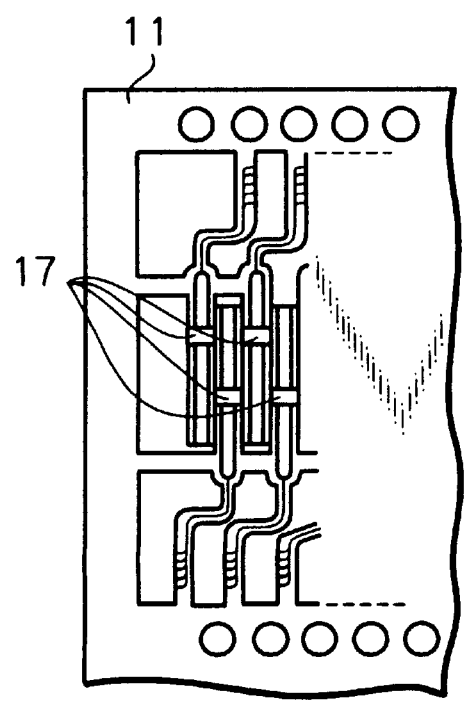

FIGS. 1a and 1b illustrate parts of fabricating processes of the preferred embodiment of the manufacturing method of the magnetic head suspension assembly according to the present invention. This embodiment relates to the magnetic head suspension assembly with a three-piece structure suspension formed from discrete components of a flexure, a load beam and a base plate.

First, on a flat thin metal plate or a flat metal sheet, a conductive layer with a thin-film conductive pattern that constitutes lead lines for each suspension is formed. This thin-film conductive pattern can be formed by a well-known method similar to the patterning method of forming printed circuits on a thin metal plate. Namely, the conductive pattern is formed by sequentially depositing a first insulation material layer made of a resin such as polyimide with a thickness of about 5 $\mu$m, a patterned Cu layer (conductive layer) with a thickness of about 4 $\mu$m, and a second insulation material layer made of a resin such as polyimide with a thickness of about 5 $\mu$m on the thin metal plate in this order. The thin metal plate is made of in this embodiment a stainless steel plate (for example SUS304TA) with a thickness of about 25 $\mu$m.

Then, as shown in FIG. 1a, the thin metal plate with thus formed conductive layer is partially cut by for example an etching process to form a flexure blank 11 on which a plurality of flexure pieces 10 partially coupled with each other are arranged. Each of the flexure pieces 10 does not have bend portions at this stage, and therefore the flexure blank 11 is kept substantially flat.

Figure 2:
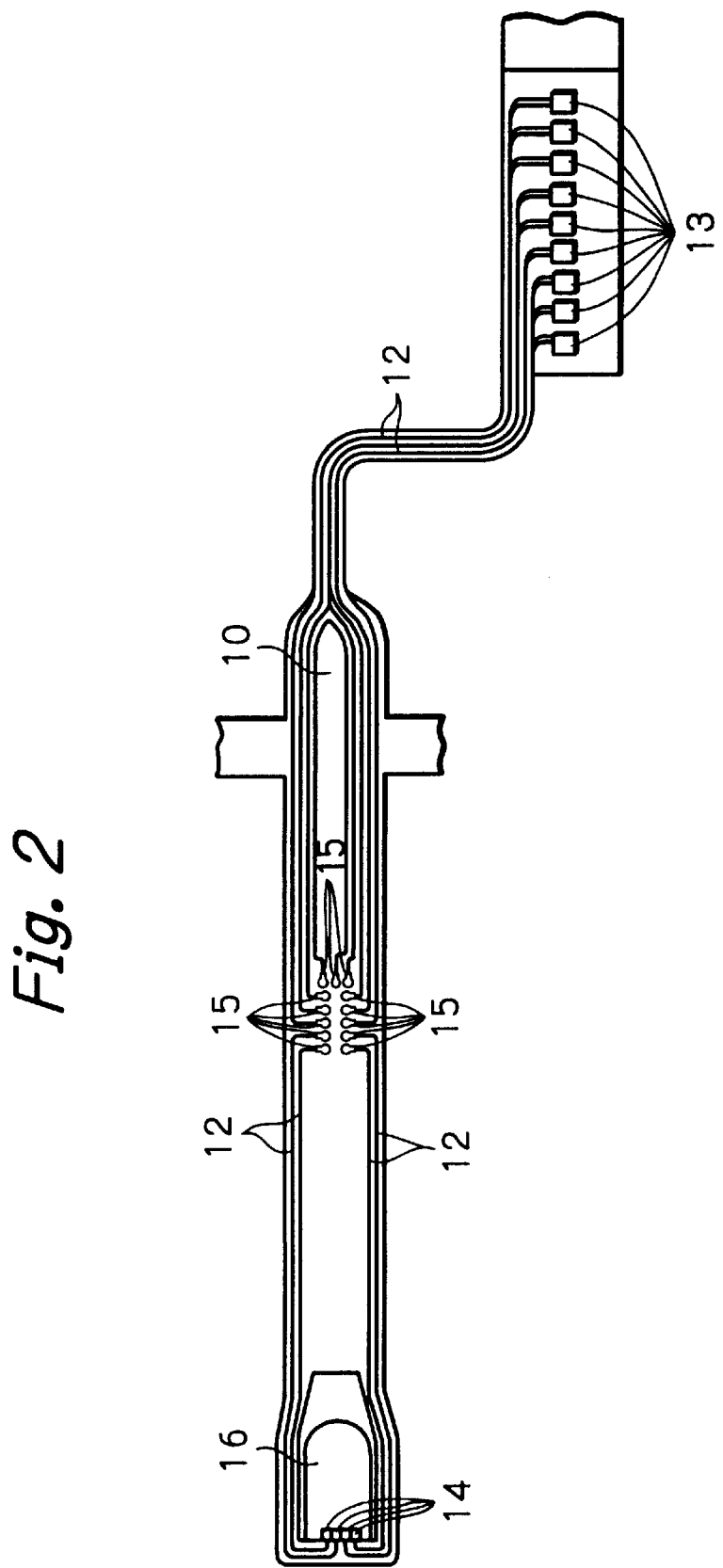

FIG. 2 illustrates an enlarged one of the flexure pieces 10 at this state. In the figure, reference numeral 12 denotes the conductive layer with the thin-film conductive pattern that constitutes the lead lines running along the longitudinal direction of the flexure piece 10. One end of the conductive layer 12 is connected to connection terminals 13 which will be connected to external circuits, and the other end of the conductive layer 12 is connected to connection terminals 14 which will be connected to terminals of a slider. On a middle portion of the conductive layer 12, connection pads 15 for a head IC chip are formed. Within the regions of the connection terminals 13 and 14 and also the connection pads 15, a Ni layer and an Au layer are sequentially deposited on the Cu layer and there is no second insulation material layer.

In FIG. 2, furthermore, reference numeral 16 denotes a tongue portion of the flexure piece 10 for carrying the slider. According to this embodiment, the tongue portion 16 is bent, at this stage namely before mounting the head IC chip, to adequately adjust static attitude of the slider that will be attached thereto.

Then, as shown in FIG. 1b, head IC chips 17 are mounted on and connected to the connection pads 15 on the respective flexure pieces 10 of the flexure blank 11. Each of the head IC chips 17 in this embodiment is formed by a bear chip and thus mounted on the pads 15 by flip chip bonding using solder. In modifications, the head IC chip 17 may be mounted on the pads 15 by ultrasonic bonding using Au bumps. In the latter case, since no soldering flux is used, contamination at the bonding portion will never occur. Thus, no cleaning process after the head IC chip mounting process is necessary resulting the manufacturing processes of the head suspension assembly to simplify.

After mounting the head IC chips 17 on the flexure pieces 10, the performance of the head IC chips 17 and electrical connection between the head IC chips 17 and the pads 15 are checked by an electrical characteristics testing process. This testing process will be executed by connecting a dummy resistor which corresponds to a read out element of the magnetic head and a dummy inductor which corresponds to a write element of the magnetic head to the connection terminal 14 of each flexure piece 10, by inputting a signal which will be applied to the head IC chip into the connection terminal 13 and by measuring the output signal from the head IC chip 17.

Figure 3:
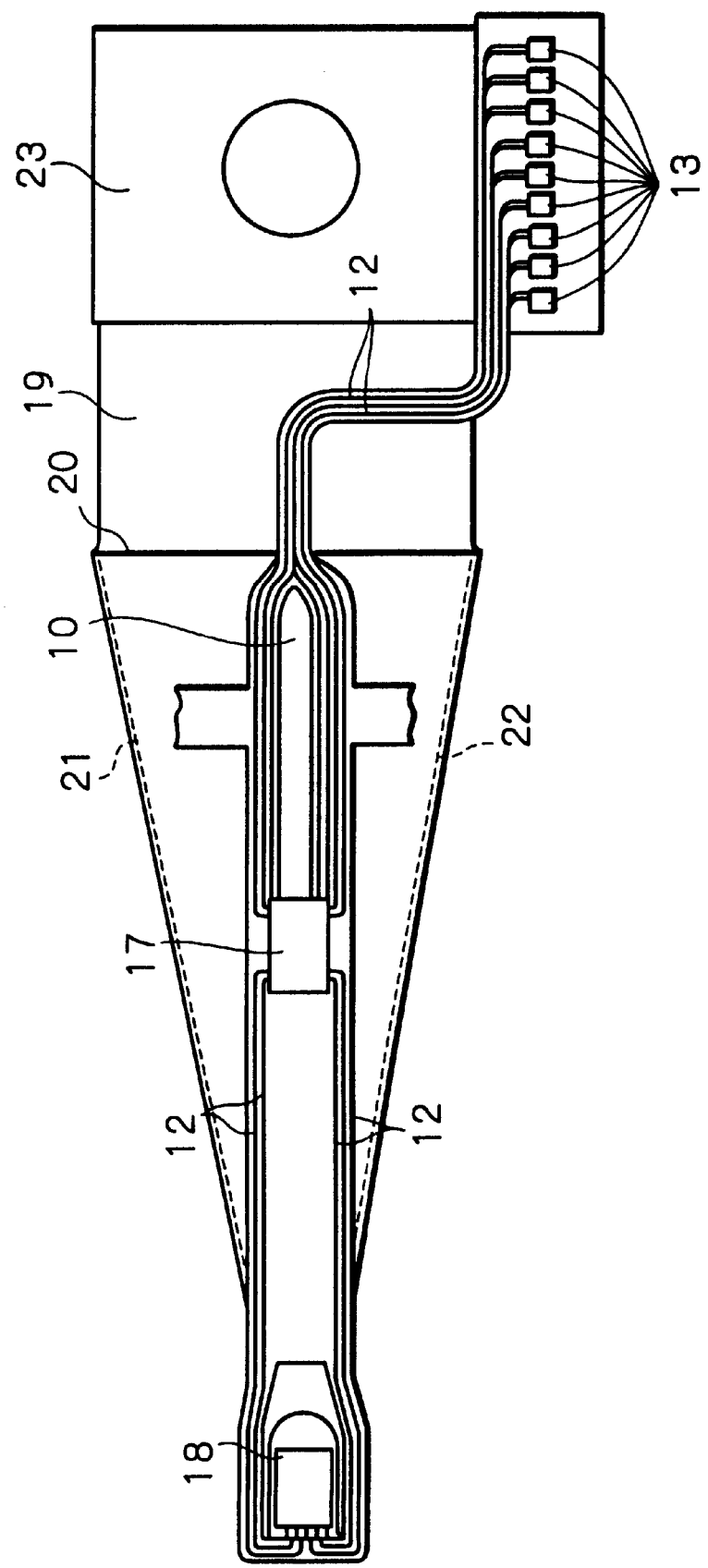
FIG. 3 shows a plane view of the magnetic head suspension assembly with a load beam and the flexure fixed to the load beam in the embodiment shown in FIGS. 1a and 1b.

Thereafter, the coupled flexure pieces 10 on which the head IC chips 17 are mounted are separated into individual pieces. Then, as shown in FIG. 3, a load beam 19 at which a bend portion of "gram-load" 20 and side rail bend portions for reinforcement 21 and 22 are preliminarily formed is fixed on the bottom surface of the flexure piece 10. The flexure piece 10 and the load beam 19 constitute the fundamental portion of the suspension. In FIG. 3, reference numeral 23 denotes a base plate attached to the end portion of the load beam 19.

The load beam 19 is made of in this embodiment a stainless steel plate with a thickness of about 70–75 μm and supports the flexure piece 10 along its whole length. This load beam 19 has a shape with a width that narrows with approaching to its top end. Fixing of the flexure piece 10 with the load beam 19 is achieved by means of a plurality of welded spots.

After that, as shown in FIG. 3, a slider 18 with a magnetic head element such as a MR read out element is mounted on the tongue portion 16 of the flexure piece and electrodes (not shown) of the slider 18 are electrically connected to the connection terminals 14.

When mounting the head IC chips 17 on the flexure pieces 10, it is necessary to accurately align connection electrodes (not shown) of each head IC chip to the connection pads 15. However, as mentioned above, according to this embodiment, the head IC chips 17 are mounted on the substantially flat flexure blank 11. Therefore, the alignment and mounting of the head IC chips to the respective flexure pieces can be accurately and easily executed, and thus extremely accurate assembling of the head-suspension assemblies can be expected. Furthermore, assembling of the head IC chips with the suspensions can be easily automated. Thus, the manufacturing costs of the fabricated magnetic head suspension assembly can be reduced without sacrificing quality.

Furthermore, since the electrical characteristics test of the head IC chips 17 is executed with the substantially flat flexure blank 11, electrical contacts of probes with the connection terminals 13 and 14 can become easy. Also, the testing process of the head IC chips 17 mounted on each flexure piece of the flexure blank 11 can be easily automated. In addition, since the electrical characteristic test is executed at this early stage, remounting of another head IC chip becomes easy when it is found that the mounted head IC chip is defective. Alternately, no following process will be executed for the flexure piece to avoid needless processes when it is found that the head IC chip mounted on this flexure piece is defective.

In a modification of the present invention, the bending work of the tongue portions 16 of the respective flexure pieces to adjust static attitude of the sliders to be attached may be executed after the head IC chips are mounted but before the flexure pieces are separated. In a further modification of the present invention, the bending work of the tongue portions 16 of the respective flexure pieces may be executed after the flexure pieces are separated.

Although the flexure blank 11 is made from a flat thin metal plate in the aforementioned embodiments, such the flexure blank can be made in another embodiment by roll to roll process using a rolled hoop material as TAB (Tape Automated Bonding) process.

In another modification, fixing of the flexure piece 10 with the load beam 19 may be executed after the head IC chips 17 are mounted but before the coupled flexure pieces 10 are separated into individual pieces.

Figure 4A:
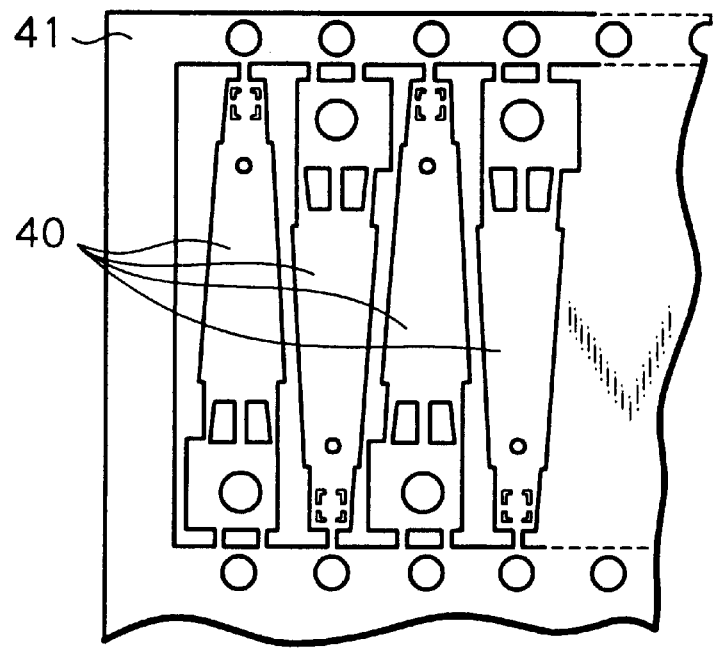
FIGS. 4a and 4b show plane views illustrating parts of processes of another embodiment of a method for manufacturing a magnetic head suspension assembly according to the present invention.
Figure 4B:
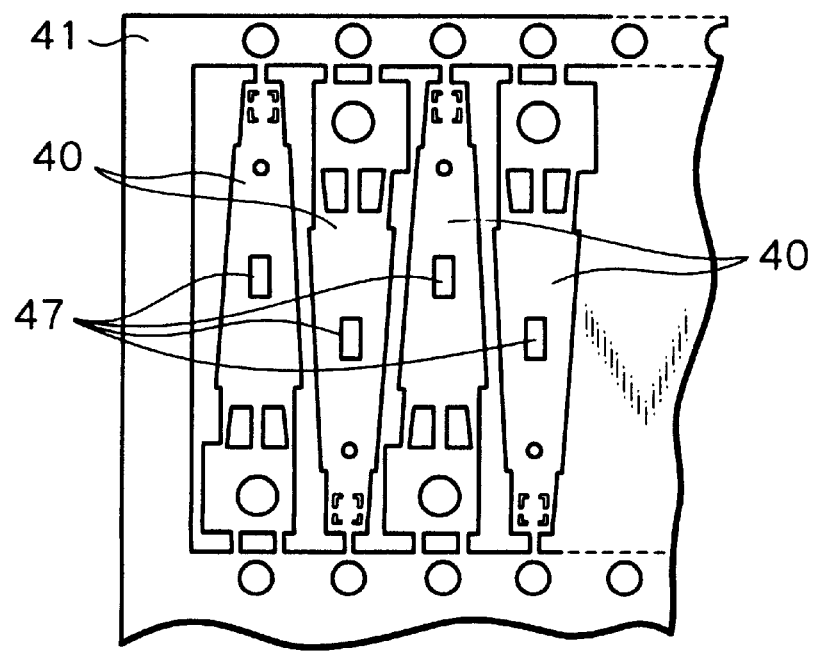
Figure 6:
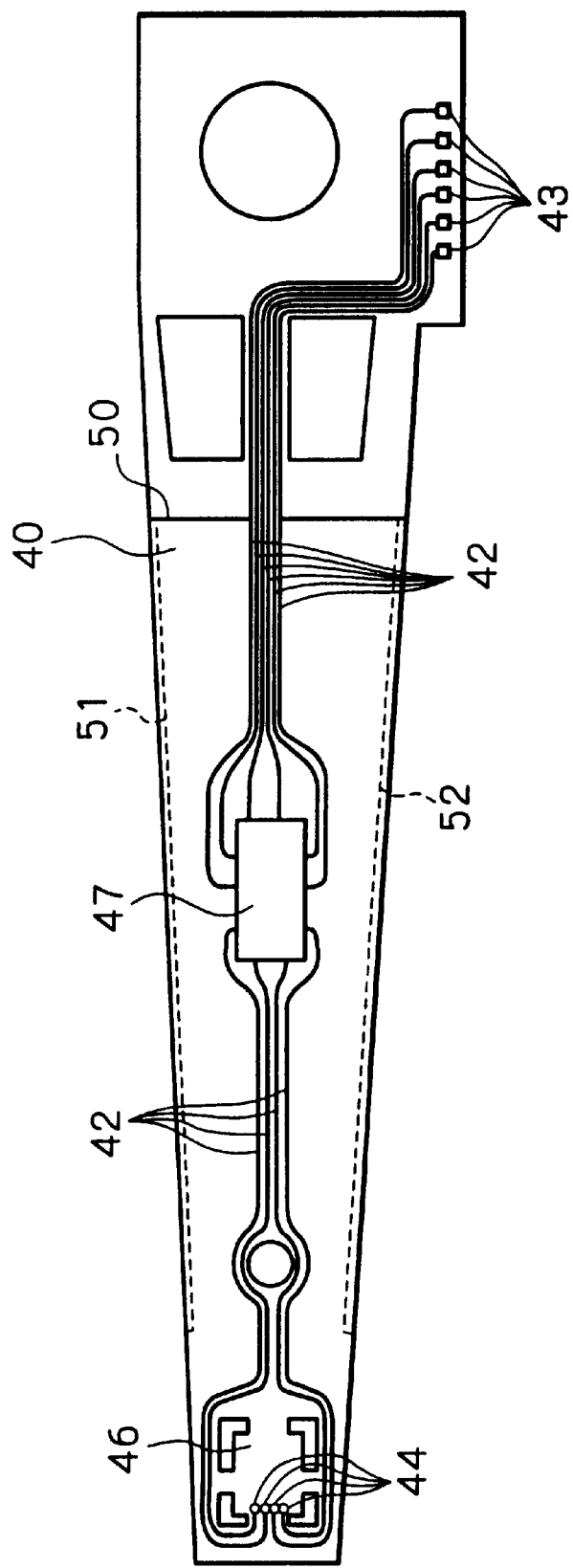
FIG. 6 shows a plane view of the flexure-load beam piece with the IC chip after the flexure-load beam bending in the embodiment shown in FIGS. 4a and 4b.

FIGS. 4a and 4b illustrate parts of fabricating processes of another embodiment of the manufacturing method of the magnetic head suspension assembly according to the present invention. This embodiment relates to the magnetic head suspension assembly with a two-piece structure suspension in which the flexure and the load beam are integrated from the beginning.

First, on a flat thin metal plate or a flat metal sheet, a conductive layer with a thin-film conductive pattern that constitutes lead lines for each suspension is formed. This thin-film conductive pattern can be formed by a well-known method similar to the patterning method of forming printed circuits on a thin metal plate. Namely, the conductive pattern is formed by sequentially depositing a first insulation material layer made of a resin such as polyimide with a thickness of about 5 μm, a patterned Cu layer (conductive layer) with a thickness of about 4 μm, and a second insulation material layer made of a resin such as polyimide with a thickness of about 5 μm on the thin metal plate in this order. The thin metal plate is made of in this embodiment a stainless steel plate (for example SUS304TA) with a thickness of about 70–75 μm.

Then, as shown in FIG. 4a, the thin metal plate with thus formed conductive layer is partially cut by for example an etching process to form a flexure-load beam blank 41 on which a plurality of flexure-load beam pieces 40 partially coupled with each other are arranged. Each of the flexure-load beam pieces 40 does not have bend portions at this stage, and therefore the flexure-load beam blank 41 is kept substantially flat.

FIG. 5 illustrates an enlarged one of the flexure-load beam pieces 40 at this state. In the figure, reference numeral 42 denotes the conductive layer with the thin-film conductive pattern that constitutes the lead lines running along the longitudinal direction of the flexure-load beam piece 40. One end of the conductive layer 42 is connected to connection terminals 43 which will be connected to external circuits, and the other end of the conductive layer 42 is connected to connection terminals 44 which will be connected to terminals of a slider. On a middle portion of the conductive layer 42, connection pads 45 for a head IC chip are formed. Within the regions of the connection terminals 43 and 44 and also the connection pads 45, a Ni layer and an Au layer are sequentially deposited on the Cu layer and there is no second insulation material layer.

In FIG. 5, furthermore, reference numeral 46 denotes a tongue portion of the flexure-load beam piece 40 for carrying the slider. According to this embodiment, the tongue portion 46 is bent, at this stage namely before mounting the head IC chip and the slider, to adequately adjust static attitude of the slider that will be attached thereto.

Then, as shown in FIG. 4b, head IC chips 47 are mounted on and connected to the connection pads 45 on the respective flexure-load beam pieces 40 of the flexure-load beam blank 41. Each of the head IC chips 47 in this embodiment is formed by a bear chip and thus mounted on the pads 45 by flip chip bonding using solder. In modifications, the head IC chip 47 may be mounted on the pads 45 by ultra sonic bonding using Au bumps. In the latter case, since no soldering flux is used, contamination at the bonding portion will never occur. Thus, no cleaning process after the head IC chip mounting process is necessary resulting the manufacturing processes of the head suspension assembly to simplify.

After mounting the head IC chips 47 on the flexure-load beam pieces 40, the performance of the head IC chips 47 and electrical connection between the head IC chips 47 and the pads 45 are checked by an electrical characteristics testing process. This testing process will be executed by connecting a dummy resistor which corresponds to a read out element of the magnetic head and a dummy inductor which corresponds to a write element of the magnetic head to the connection terminal 44 of each flexure-load beam piece 40, by inputting a signal which will be applied to the head IC chip into the connection terminal 43 and by measuring the output signal from the head IC chip 47.

Thereafter, the coupled flexure-load beam pieces 40 on which the head IC chips 47 are mounted are separated into individual pieces. Then, as shown in FIG. 5, bending works of the flexure-load beam pieces, namely forming of bend portion of "gram-load" 50 and side rail bend portions for reinforcement 51 and 52 is executed. This bending works may be executed before separation of the coupled flexure-load beam pieces 40 but after the head IC chips 47 are mounted.

After that, although it is not shown in the figures, a slider with a magnetic head element such as a MR read out element is mounted on the tongue portion 46 of the flexure-load beam piece and electrodes (not shown) of the slider are electrically connected to the connection terminals 44.

When mounting the head IC chips 47 on the flexure-load beam pieces 40, it is necessary to accurately align connection electrodes (not shown) of each head IC chip to the connection pads 45. However, as mentioned above, according to this embodiment, the head IC chips 47 are mounted on the substantially flat flexure-load beam blank 41. Therefore, the alignment and mounting of the head IC chips to the respective flexure-load beam pieces can be accurately and easily executed, and thus extremely accurate assembling of the head-suspension assemblies can be expected. Furthermore, assembling of the head IC chips with the suspensions can be easily automated. Thus, the manufacturing costs of the fabricated magnetic head suspension assembly can be reduced without sacrificing quality.

Furthermore, since the electrical characteristics test of the head IC chips 47 is executed with the substantially flat flexure-load beam blank 41, electrical contacts of probes with the connection terminals 43 and 44 can become easy. Also, the testing process of the head IC chips 47 mounted on each flexure piece of the flexure-load beam blank 41 can be easily automated. In addition, since the electrical characteristic test is executed at this early stage, remounting of another head IC chip becomes easy when it is found that the mounted head IC chip is defective. Alternately, no following process will be executed for the flexure-load beam piece to avoid needless processes when it is found that the head IC chip mounted on this flexure-load beam piece is defective.

In a modification, the bending work of the tongue portions 46 of the respective flexure-load beam pieces to adjust static attitude of the sliders to be attached may be executed after the head IC chips are mounted but before the flexure-load beam pieces are separated. In a further modification of the present invention, the bending work of the tongue portions 46 of the respective flexure-load beam pieces may be executed after the flexure-load beam pieces are separated.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for manufacturing a magnetic head suspension assembly comprising the steps of:

forming a plurality of flexure, pieces coupled with each other and lying flat over their combined surfaces, each of said flexure pieces being provided with a conductive connection pattern;

mounting, head IC chips on respective ones of the substantially flat flexure pieces, said mounting being executed before fixing of said flexure pieces to load beams; and separating said flexure pieces with the head IC chips into individual pieces.

2. The method as claimed in claim 1, wherein said method further comprises a step of checking electrical characteristics of said mounted head IC chips, said check being executed before fixing of said flexure pieces to the load beams.

3. The method as claimed in claim 1, wherein said method further comprises a step of mounting sliders with magnetic head elements on the separated flexure pieces.

4. The method as claimed in claim 1, wherein said head IC chip mounting step comprises a step of mounting the head IC chips on the respective flexure pieces by flip chip bonding process.

5. The method as claimed in claim 1, wherein said head IC chip mounting step comprises a step of mounting the head IC chips on the respective flexure pieces by ultrasonic bonding process.

6. The method as claimed in claim 3, wherein each of said flexure pieces has a tongue portion for fixing the slider, and wherein said method further comprises a step of bending the tongue portions of the respective flexure pieces so as to adjust static attitude of the sliders to be attached, said tongue portion bending step being executed before said head IC chips are mounted.

7. The method as claimed in claim 3, wherein each of said flexure pieces has a tongue portion for fixing the slider, and wherein said method further comprises a step of bending the tongue portions of the respective flexure pieces so as to adjust static attitude of the sliders to be attached, said tongue portion bending step being executed after said head IC chips are mounted but before said coupled flexure pieces are separated into individual pieces.

8. The method as claimed in claim 3, wherein each of said flexure pieces has a tongue portion for fixing the slider, and wherein said method further comprises a step of bending the tongue portions of the respective flexure pieces so as to adjust static attitude of the sliders to be attached, said tongue portion bending step being executed after said coupled flexure pieces are separated into individual pieces.

9. The method as claimed in claim 1, wherein said method further comprises a step of fixing a load beam to each of the separated flexure piece.

10. The method as claimed in claim 9, wherein said fixing step is executed after said head IC chips are mounted but before said coupled flexure pieces are separated into individual pieces.

11. The method as claimed in claim 9, wherein said fixing step is executed after said coupled flexure pieces are separated into individual pieces.

12. The method as claimed in claim 1, wherein said forming step comprises a step of forming the plurality of flexure pieces coupled with each other from a flat sheet material.

13. The method as claimed in claim 1, wherein said forming step comprises a step of forming the plurality of flexure pieces coupled with each other from a rolled hoop material.

14. The method as claimed in claim 3, wherein said mounting step comprises a step of mounting sliders with magnetoresistive type read out magnetic head elements on the respective flexure pieces.

15. A method for manufacturing a magnetic head suspension assembly comprising the steps of:
 forming a plurality of flexure-load beam pieces coupled with each other and lying flat over their combined surfaces, each of said flexure-load beam pieces-being-provided with a conductive connection pattern;
 mounting head IC chips on respective ones of the substantially flat flexure-load beam pieces, said mounting being executed before said flexure-load beam pieces are bent; and
 separating said flexure-load beam pieces with the head IC chips into individual pieces.

16. The method as claimed in claim 15, wherein said method further comprises a step of checking electrical characteristics of said mounted head IC chips, said check being executed before said flexure-load beam pieces are bent.

17. The method as claimed in claim 15, wherein said method further comprises a step of mounting sliders with magnetic head elements on the separated flexure-load beam pieces.

18. The method as claimed in claim 15, wherein said head IC chip mounting step comprises a step of mounting the head IC chips on the respective flexure-load beam pieces by flip chip bonding process.

19. The method as claimed in claim 15, wherein said head IC chip mounting step comprises a step of mounting the head IC chips on the respective flexure-load beam pieces by ultrasonic bonding process.

20. The method as claimed in claim 17, wherein each of said flexure-load beam pieces has a tongue portion for fixing the slider, and wherein said method further comprises a step of bending the tongue portions of the respective flexure-load beam pieces so as to adjust static attitude of the sliders to be attached, said tongue portion bending step being executed before said head IC chips are mounted.

21. The method as claimed in claim 17, wherein each of said flexure-load beam pieces has a tongue portion for fixing the slider, and wherein said method further comprises a step of bending the tongue portions of the respective flexure-load beam pieces so as to adjust static attitude of the sliders to be attached, said tongue portion bending step being executed after said head IC chips are mounted but before said coupled flexure-load beam pieces are separated into individual pieces.

22. The method as claimed in claim 17, wherein each of said flexure-load beam pieces has a tongue portion for fixing the slider, and wherein said method further comprises a step of bending the tongue portions of the respective flexure-load beam pieces so as to adjust static attitude of the sliders to be attached, said tongue portion bending step being executed after said coupled flexure-load beam pieces are separated into individual pieces.

23. The method as claimed in claim 15, wherein said method further comprises a step of bending each of the flexure-load beam pieces.

24. The method as claimed in claim 23, wherein said bending step is executed after said head IC chips are mounted but before said coupled flexure-load beam pieces are separated into individual pieces.

25. The method as claimed in claim 23, wherein said bending step is executed after said coupled flexure-load beam pieces are separated into individual pieces.

26. The method as claimed in claim 15, wherein said forming step comprises a step of forming the plurality of flexure-load beam pieces coupled with each other from a flat sheet material.

27. The method as claimed in claim 15, wherein said forming step comprises a step of forming the plurality of flexure-load beam pieces coupled with each other from a rolled hoop material.

28. The method as claimed in claim 17, wherein said mounting step comprises a step of mounting sliders with magnetoresistive type read out magnetic head elements on the respective flexure-load beam pieces.

* * * * *